(12) United States Patent
Hoffmann et al.

(10) Patent No.: US 7,526,920 B2
(45) Date of Patent: May 5, 2009

(54) METHOD OF OPERATING AN ATOMIZING ARRANGEMENT

(75) Inventors: Juergen Hoffmann, Untersiggenthal (CH); Carlos Jimenez Haertel, Munich (DE); Sasha Savic, Wettingen (CH)

(73) Assignee: Alstom Technology Ltd, Baden (CH)

( * ) Notice: Subject to any disclaimer, the term of this patent is extended or adjusted under 35 U.S.C. 154(b) by 364 days.

(21) Appl. No.: 11/416,166

(22) Filed: May 3, 2006

(65) Prior Publication Data

US 2006/0277916 A1    Dec. 14, 2006

Related U.S. Application Data

(63) Continuation of application No. PCT/EP2004/052794, filed on Nov. 4, 2004.

(30) Foreign Application Priority Data

Nov. 7, 2003    (DE) ................. 103 52 088

(51) Int. Cl.
    *F02C 3/30*    (2006.01)
(52) U.S. Cl. .................... 60/775; 60/39.53
(58) Field of Classification Search .......... 60/775, 60/39.59, 728, 39.53
    See application file for complete search history.

(56) References Cited

U.S. PATENT DOCUMENTS

| | | | |
|---|---|---|---|
| 6,250,064 B1 * | 6/2001 | Tomlinson et al. | 60/775 |
| 6,357,236 B1 * | 3/2002 | Utamura | 60/728 |
| 6,478,289 B1 | 11/2002 | Trewin | |
| 6,634,165 B2 * | 10/2003 | Tomlinson et al. | 60/39.3 |
| 6,805,483 B2 * | 10/2004 | Tomlinson et al. | 374/144 |
| 2001/0000611 A1 | 5/2001 | Cline et al. | |
| 2002/0141882 A1 | 10/2002 | Ingistov et al. | |
| 2004/0255596 A1 * | 12/2004 | Horii et al. | 60/775 |
| 2006/0137356 A1 * | 6/2006 | Haertel et al. | 60/775 |
| 2006/0218931 A1 * | 10/2006 | Haertel et al. | 60/775 |
| 2006/0254283 A1 * | 11/2006 | Savic et al. | 60/775 |

FOREIGN PATENT DOCUMENTS

| | | |
|---|---|---|
| DE | 100 42 325 A1 | 3/2002 |
| EP | 0 898 645 B1 | 3/1999 |
| FR | 1563749 | 3/1969 |

(Continued)

OTHER PUBLICATIONS

*Form PCT/ISA/210 (International Search Report) dated Apr. 20, 2005.

(Continued)

*Primary Examiner*—William H Rodriguez
(74) *Attorney, Agent, or Firm*—Buchanan Ingersoll & Rooney PC

(57) ABSTRACT

A liquid atomizing arrangement comprises: a line system, at least one pressure atomizer nozzle, at least one line for the liquid to be atomized, and at least one first actuator for setting the atomizing supply pressure and/or the liquid mass flow through the atomizing arrangement. method of operating the liquid atomizing arrangement comprises the steps of measuring the mass flow flowing through the liquid atomizing arrangement, of measuring the atomizing supply pressure upstream of the pressure atomizer nozzle, and of acting upon the first actuator as a function of at least one of these measured values.

13 Claims, 2 Drawing Sheets

FOREIGN PATENT DOCUMENTS

| | | |
|---|---|---|
| WO | 99/67517 A1 | 12/1999 |
| WO | 00/08326 A2 | 2/2000 |
| WO | 00/34638 A1 | 6/2000 |
| WO | 03/035269 A1 | 5/2003 |
| WO | 03/089777 A1 | 10/2003 |
| WO | 2004025102 A1 | 3/2004 |
| WO | 2005/008044 A1 | 1/2005 |

OTHER PUBLICATIONS

*Form PCT/ISA/237 (Written Opinion of the International Searching Authority) dated Aug. 7, 2005.

*Form PCT/IPEA/409 (International Preliminary Report on Patentability) dated Apr. 3, 2006.

* cited by examiner

METHOD OF OPERATING AN ATOMIZING ARRANGEMENT

RELATED APPLICATION

This application claims priority under 35 U.S.C. §119 to German Application No. 103 52 088.0 filed in Germany on Nov. 7, 2003, and as a continuation application under 35 U.S.C. §120 to PCT/EP2004/052794 filed as an International Application on Nov. 4, 2004, designating the U.S., the entire contents of which are hereby incorporated by reference.

TECHNICAL FIELD

The present invention relates to a method according to the preamble of claim 1.

PRIOR ART

It is well known in the prior art, for example from FR 1563749, to inject a liquid into the intake duct of internal combustion engines, for example gas turbosets. The intake air is cooled, and the output increased, by the evaporation of the liquid. The effect can be further increased if the injected liquid mass flow is selected to be so large that the intake air is no longer able to absorb said liquid mass flow, that is to say it is oversaturated with the latter, in such a way that at least some of the liquid only evaporates during the compression. If liquid droplets therefore penetrate into the largely adiabatic turbocompressor of a gas turboset, intensive internal cooling results from the evaporation in the compressor, and the power input of the compressor is reduced, which is able to significantly increase the net power output of the gas turboset.

The significance of the fineness of the injected droplet spray has likewise been disclosed by FR 1563749.

The use of pressure atomizer nozzles is described in EP 898645. WO 9967517 describes how hot water under pressure is atomized by spontaneous boiling during the nozzle discharge. In both cases, the atomizing liquid is atomized with high pressure by nozzles having comparatively small passage cross sections. Potential erosion of the nozzles cannot be ruled out and tends to lead to a significant deterioration in the quality of the spray produced, if no corresponding countermeasures are taken.

DESCRIPTION OF THE INVENTION

The invention is intended to provide a remedy here. The object of the invention characterized in the claims is to specify a method of the type mentioned at the beginning which is able to avoid the disadvantages of the prior art. A method is to be specified with which aging effects which are primarily caused by erosion of nozzles can be observed and quantified during operation. Furthermore, the parameters of the atomized spray are to be maintained for as long as possible within admissible ranges by suitable measures.

According to the invention, this object is achieved by the use of all the features of claim 1 in their entirety.

The essence of the invention is therefore to simultaneously measure the atomizing supply pressure and the mass flow within a liquid atomizing arrangement and, as a function of at least one of the measured values, to act upon an actuator for setting the atomizing supply pressure and/or the mass flow. According to the invention, the first actuator is operated in a closed control loop. At predetermined nozzle geometries and cross sections, the mass flow is essentially proportional to the square root of the atomizing supply pressure. The atomizing supply pressure is also decisive for the droplet size spectrum of the spray produced. In order to vary the mass flow independently of the pressure, it is known to change the number of nozzles to which liquid is admitted. The first actuator is preferably a variable-speed drive of a pump, or a variable throttle element arranged in a line leading from a pump to a pressure atomizer nozzle.

The actuator is operated with the atomizing supply pressure as controlled variable. The actuator is therefore acted upon as a function of the measured atomizing supply pressure.

The first actuator serves to control the atomizing supply pressure. In this case, the number of atomizing nozzles to which liquid is admitted serves as mass-flow manipulated variable. The first actuator is operated with the atomizing supply pressure as controlled variable in a closed control loop. The number of nozzles to which liquid is admitted is operated with the mass flow as controlled variable in a closed control loop.

According to a first embodiment of the invention, the actuator is operated with the liquid mass flow as controlled variable. The actuator is therefore acted upon as a function of the measured liquid mass flow.

According to a second embodiment of the invention, the actuator is operated with the atomizing supply pressure as controlled variable. The actuator is therefore acted upon as a function of the measured atomizing supply pressure.

According to an alternative embodiment of the invention, the first actuator serves to control the liquid mass flow. In this case, the number of atomizing nozzles to which liquid is admitted serves as atomizing-supply-pressure manipulated variable. The first actuator is operated with the liquid mass flow as controlled variable in a closed control loop. The number of nozzles to which liquid is admitted is operated with the mass flow as controlled variable in a closed control loop.

According to a fourth embodiment of the invention, the first actuator serves to control the liquid mass flow. In this case, the number of atomizing nozzles to which liquid is admitted serves as atomizing-supply-pressure manipulated variable. The first actuator is operated with the liquid mass flow as controlled variable in a closed control loop. The number of nozzles to which liquid is admitted is operated with the atomizing supply pressure as controlled variable in a closed control loop.

To admit liquid to atomizer nozzles, control valves are preferably selectively opened and closed. In this case, via a respective control valve, either an individual atomizer nozzle or preferably a group of atomizer nozzles is activated.

In a development of the inventive idea, a correlation of measured pressure and mass flow is formed. This correlation is compared with a reference correlation. The reference correlation is either theoretically predetermined or the pressure/mass flow characteristic or respectively characterstics for different nozzle numbers to which liquid is admitted are determined in the new state of the atomizing arrangement. If the measured correlation deviates from the reference correlation by more than a maximum admissible limit value to be established from case to case, this is regarded as a measure of excessive wear of the atomizer nozzles. The actions which may be taken are to transmit a warning or alarm signal, and/or the liquid injection is shut down if appropriate. The correlation can be determined in an especially simple manner by the proportionality constant between the mass-flow square and the pressure being determined, the deviation of said proportionality constant from a reference value constituting a measure of the wear of the atomizing arrangement.

In a configuration of the invention, the liquid is injected upstream of the compressor of a gas turboset or inside the compressor into the working air flow of the gas turboset. In this case, the mass flow is set within the output control of the gas turboset and serves as manipulated variable of the output control loop. In particular, the control of the gas turboset can firmly preset a mass flow which is then controlled according to one of the methods described above.

BRIEF DESCRIPTION OF THE DRAWING

The invention is explained in more detail below with reference to exemplary embodiments illustrated in the drawing. The figures show two embodiments of atomizing arrangements, operable according to the invention, in power plants. Elements which are not directly necessary for the understanding of the invention have been omitted. The exemplary embodiments are to be understood in a purely instructive manner and are not to be used to restrict the invention characterized in the claims.

WAY OF IMPLEMENTING THE INVENTION

Figure 1:
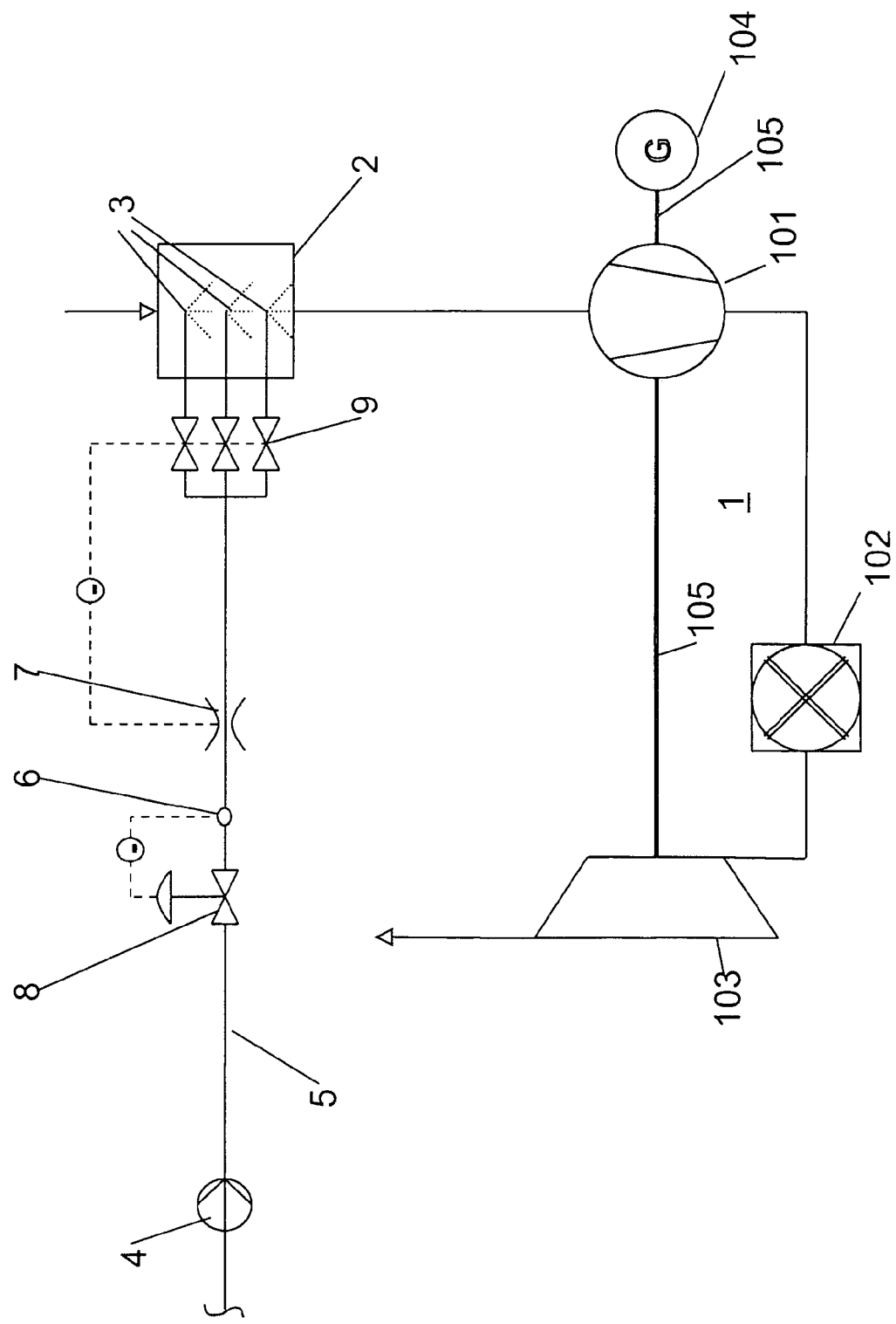

An embodiment of the invention is described in conjunction with FIG. 1. A gas turboset 1 has a compressor 101, a combustion chamber 102 and a turbine 103. The turbine 103 and the compressor 101 and also a generator 104 are arranged on a common shaft line 105. Arranged in the inflow duct of the compressor, through which air flows to the compressor 101 during operation, is an injection device 2 which has a plurality of separately activatable atomizer nozzles or nozzle groups 3. The nozzles 3 can produce a liquid mist which evaporates upstream of the compressor or in the compressor and therefore brings about an increase in the net power output of the gas turboset in the manner described. A pump 4 brings the liquid to the atomizing supply pressure. The liquid flows through the line 5 to the control valves 9, from where the flow path to the atomizer nozzles 3 is selectively opened up. According to the invention, a pressure-measuring point 6 and a mass-flow measuring point 7 are arranged in the line 5. The actuator 8, here a throttle element, is activated starting from the measured atomizing supply pressure at the pressure-measuring point 6. If the measured pressure is below a setpoint, the actuator 8 is opened further. If the measured pressure is above a setpoint, the throttle element 8 is throttled to a greater extent. In this way, the atomizing supply pressure is controlled to a setpoint or within a setpoint interval. The control can be designed as a continuous or intermittent control, in an especially simple manner as a two-step control. If the pump 4 has a variable-speed drive, the speed of the pump can be influenced starting from the measured pressure value in such a way that, if the pressure drops below a pressure setpoint, the pump speed is increased and, if the pressure setpoint is exceeded, the pump speed is reduced. Of course, under otherwise unchanged conditions, a pressure change also brings about a mass-flow change in the atomizing arrangement. In this case, the atomizing supply pressure is essentially proportional to the square of the mass flow, apart from subordinate influencing variables such as friction effects. In pressure atomizing arrangements in which the pressure drop of the atomizing liquid is effected mainly over the atomizer nozzles, the proportionality constant is virtually only a function of the number and geometry of the atomizer nozzles. With erosion of the atomizer nozzles, which potentially occurs in the course of operation, this proportionality constant changes. It likewise changes if nozzles of the atomizing system become obstructed by contamination, or if damage to the system occurs. In an especially simple manner, the proportionality constants can be determined in the new state of the atomizing arrangement, or a set of proportionality constants which are determined as a function of the number and if need be of the type of atomizer nozzles to which liquid is admitted. These values are used as reference constants. By means of the continual measurement of the atomizer supply pressure and of the mass flow during the operating period, these proportionality constants can be recorded at any desired times during operation. On the one hand, this enables trend curves of the proportionality constants to be plotted, from which the wear or other changes in the atomizing components, such as contamination for example, can be read off. On the other hand, a currently determined correlation of mass flow and atomizing supply pressure can be compared with the reference correlation determined in the new state in such a way that, in the event of a deviation which is deemed an admissible limit value, a warning signal is transmitted, or the atomizing arrangement is shut down for safety reasons.

Figure 2:
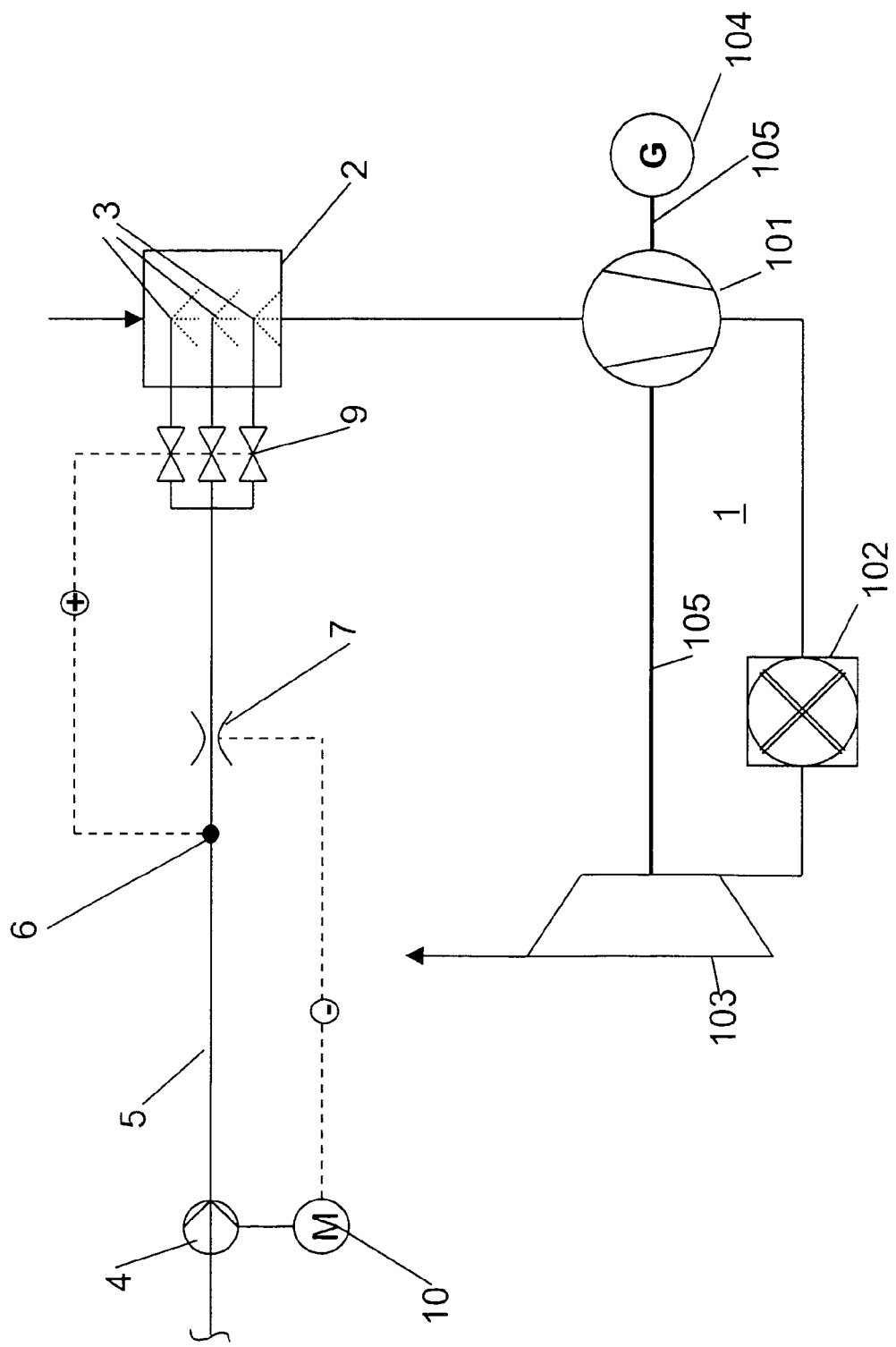

In the embodiment shown in FIG. 2, the pump of the atomizing arrangement has a variable-speed drive 10. In the embodiment shown, the drive is used as manipulated variable for control of the mass flow. If the measured mass flow drops below a setpoint, the speed is increased. If the measured mass flow increases above a setpoint, the speed is reduced. The number of nozzles or nozzle groups in operation is used as manipulated variable for the atomizing supply pressure. If the atomizing supply pressure increases above a setpoint, larger cross sections of flow are opened up; in particular further control valves 9 are opened in the embodiment shown. If the atomizing supply pressure drops below a setpoint, the free cross sections of flow are reduced; in particular control valves 9 are closed in the embodiment shown. On account of the correlation of mass flow and pressure, it is perfectly possible for the pump speed to be equally used as manipulated variable for the atomizing supply pressure and for the number of nozzles or nozzle groups in operation to be equally used as manipulated variable for the mass flow. The measured values for the atomizing supply pressure and the mass flow can be used for diagnostic purposes in the manner described in connection with FIG. 1.

LIST OF DESIGNATIONS

1 Gas turboset
2 Injection device
3 Atomizer nozzles
4 Pump
5 Line
6 Pressure-measuring point
7 Mass-flow measuring point
8 Actuator, throttle element
9 Control valves
10 Variable-speed drive
101 Compressor
102 Combustion chamber
103 Turbine
104 Generator
105 Shaft

What is claimed is:

1. A method of operating a liquid atomizing arrangement in the intake line of a gas turbine engine, the liquid atomizing arrangement comprising: a line system, a plurality of pressure atomizer nozzles, at least one line for the liquid to be atomized, at least one first actuator for setting the atomizing supply pressure and/or the liquid mass flow through the atomizing arrangement; which method comprises:

measuring the mass flow flowing through the liquid atomizing arrangement;

measuring the atomizing supply pressure upstream of the plurality of pressure atomizer nozzles and acting upon the first actuator as a function of at least one of these measured values;

predetermining a setpoint or a setpoint interval for the atomizing supply pressure and acting upon the first actuator in such a way that the atomizing supply pressure is adjusted to the setpoint or within the setpoint interval;

predetermining a setpoint or a setpoint interval for the mass flow;

admitting liquid to the plurality of atomizer nozzles; and acting upon the plurality of atomizer nozzles to which liquid is admitted in such a way that the mass flow is adjusted to the setpoint or within the setpoint interval.

2. The method as claimed in claim 1, wherein shut-off members are opened in order to admit liquid to atomizer nozzles.

3. The method as claimed in claim 2, wherein the liquid mass flow is injected upstream of the compressor of a gas turboset or inside the compressor of a gas turboset, and the mass flow is set within the power control of the gas turboset, the mass flow being the manipulated variable of the control loop.

4. The method as claimed in claim 1, wherein the liquid mass flow is injected upstream of the compressor of a gas turboset or inside the compressor of a gas turboset, and the mass flow is set within the power control of the gas turboset, the mass flow being the manipulated variable of the control loop.

5. The method as claimed in claim 1, wherein the liquid mass flow is injected upstream of the compressor of a gas turboset or inside the compressor of a gas turboset, and the mass flow is predetermined as setpoint by the control of the gas turboset.

6. The method as claimed in claim 5, comprising:

forming a correlation of measured pressure and mass flow;

comparing the measured correlation with the reference correlation; and transmitting an alarm signal and/or shutting down the liquid injection in the event of a deviation between the measured correlation and the reference correlation which exceeds a threshold value.

7. The method as claimed in claim 1, wherein the at least one first actuator serves to control the atomizing supply pressure, and the number of atomizing nozzles to which liquid is admitted serves as a mass-flow manipulating variable.

8. A method of operating a liquid atomizing arrangement in the intake line of a gas turbine engine, the liquid atomizing arrangement comprising: a line system, a plurality of pressure atomizer nozzles, at least one line for the liquid to be atomized, at least one first actuator for setting the atomizing supply pressure and/or the liquid mass flow through the atomizing arrangement; which method comprises:

measuring the mass flow flowing through the liquid atomizing arrangement;

measuring the atomizing supply pressure upstream of the plurality of pressure atomizer nozzles and acting upon the first actuator as a function of at least one of these measured values;

predetermining a setpoint or a setpoint interval for the atomizing supply pressure and acting upon the first actuator in such a way that the atomizing supply pressure is adjusted to the setpoint or within the setpoint interval;

predetermining a setpoint or a setpoint interval for the mass flow;

admitting liquid to the plurality of atomizer nozzles;

acting upon the plurality of atomizer nozzles to which liquid is admitted in such a way that the mass flow is adjusted to the setpoint or within the setpoint interval;

forming a correlation of measured pressure and mass flow;

comparing the measured correlation with the reference correlation; and transmitting an alarm signal and/or shutting down the liquid injection in the event of a deviation between the measured correlation and the reference correlation which exceeds a threshold value.

9. The method as claimed in claim 8, wherein a variable is formed which essentially relates the square of the mass flow and the atomizing supply pressure to one another.

10. The method as claimed in claim 9, wherein the reference correlation is predetermined as a function of the number of atomizer nozzles to which liquid is admitted.

11. The method as claimed in claim 8, wherein the reference correlation is predetermined as a function of the number of atomizer nozzles to which liquid is admitted.

12. The method as claimed in claim 8, wherein the liquid mass flow is injected upstream of the compressor of a gas turboset or inside the compressor of a gas turboset, and the mass flow is set within the power control of the gas turboset, the mass flow being the manipulated variable of the control loop.

13. A method of operating a liquid atomizing arrangement in the intake line of a gas turbine engine, the liquid atomizing arrangement comprising: a line system, a plurality of pressure atomizer nozzles, at least one line for the liquid to be atomized, at least one first actuator for setting the atomizing supply pressure and/or the liquid mass flow through the atomizing arrangement; which method comprises:

measuring the mass flow flowing through the liquid atomizing arrangement;

measuring the atomizing supply pressure upstream of the plurality of pressure atomizer nozzles and acting upon the first actuator as a function of at least one of these measured values;

predetermining a setpoint or a setpoint interval for the atomizing supply pressure and acting upon the first actuator in such a way that the atomizing supply pressure is adjusted to the setpoint or within the setpoint interval;

predetermining a setpoint or a setpoint interval for the mass flow;

admitting liquid to a plurality of atomizer nozzles by opening a shut-off member;

acting upon the plurality of atomizer nozzles to which liquid is admitted in such a way that the mass flow is adjusted to the setpoint or within the setpoint interval;

forming a correlation of measured pressure and mass flow;

comparing the measured correlation with the reference correlation; and transmitting an alarm signal and/or shutting down the liquid injection in the event of a deviation between the measured correlation and the reference correlation which exceeds a threshold value.

* * * * *